(12) United States Patent
Hsu

(10) Patent No.: US 11,914,274 B2
(45) Date of Patent: Feb. 27, 2024

(54) PROJECTION LENS MODULE AND PROJECTOR

(71) Applicant: Coretronic Corporation, Hsin-Chu (TW)

(72) Inventor: Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 5 days.

(21) Appl. No.: 17/832,714

(22) Filed: Jun. 6, 2022

(65) Prior Publication Data

US 2022/0397812 A1 Dec. 15, 2022

(30) Foreign Application Priority Data

Jun. 11, 2021 (CN) .......................... 202121307509.2

(51) Int. Cl.
*G03B 21/14* (2006.01)
*G03B 21/22* (2006.01)

(52) U.S. Cl.
CPC .......... *G03B 21/14* (2013.01); *G03B 21/145* (2013.01); *G03B 21/22* (2013.01)

(58) Field of Classification Search
CPC ....... G03B 21/14; G03B 21/22; G03B 21/145
See application file for complete search history.

(56) References Cited

U.S. PATENT DOCUMENTS

| 2016/0161757 A1* | 6/2016 | Hee ......................... G02B 7/026 |
| | | 359/557 |
| 2018/0109660 A1* | 4/2018 | Yoon .................... H04N 23/687 |
| 2021/0011360 A1* | 1/2021 | Wu ....................... G03B 21/142 |
| 2021/0294188 A1* | 9/2021 | Hsu ........................ G02B 7/023 |
| 2022/0299848 A1* | 9/2022 | Ito ......................... G03B 21/145 |
| 2023/0015029 A1* | 1/2023 | Peng ..................... G02B 13/16 |

FOREIGN PATENT DOCUMENTS

| CN | 205539886 | 8/2016 |
| CN | 208737188 | 4/2019 |

* cited by examiner

*Primary Examiner* — Magda Cruz
(74) *Attorney, Agent, or Firm* — JCIPRNET

(57) ABSTRACT

The disclosure provides a projection lens module and a projector having the projection lens module, which may effectively suppress the shaking of the projection lens. The projection lens module includes two casings, a projection lens and a carrier structure. The projection lens is disposed between the two casings. The carrier structure includes a bracket, at least one screwing member, and two buffer members. The bracket has at least one aperture, and the screwing member passes through the aperture to lock the bracket to the projection lens. A diameter of the aperture in a first direction is greater than a diameter of the aperture in a second direction perpendicular to the first direction. The two buffer members are respectively disposed on opposite ends of the bracket and lean against the two casings in the first direction, respectively.

20 Claims, 5 Drawing Sheets

PROJECTION LENS MODULE AND PROJECTOR

CROSS-REFERENCE TO RELATED APPLICATION

This application claims the priority benefit of Chinese application serial no. 202121307509.2, filed on Jun. 11, 2021. The entirety of the above-mentioned patent application is hereby incorporated by reference herein and made a part of this specification.

BACKGROUND

Technical Field

The disclosure relates to an optical module and a display apparatus, and particularly relates to a projection lens module and a projector.

Description of Related Art

Currently in ultra short throw projectors, the projection lens is mostly disposed in a cantilever beam structure. However, if a speaker with a good low-frequency effect is integrated into the ultra short throw projector, the low-frequency resonance of the speaker tends to cause the projection lens of the ultra short throw projector to shake violently. In addition, since the projection lens of the ultra short throw projector has a relatively small throw ratio, slight shaking of the projection lens may cause obvious shaking of the projection screen, resulting in poor user perception.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection lens module capable of effectively suppressing shaking of the projection lens.

The disclosure provides a projector whose projection lens module may effectively suppress shaking of the projection lens.

A projection lens module of the disclosure includes two casings, a projection lens, and a carrier structure. The projection lens is disposed between the two casings. The carrier structure includes a bracket, at least one screwing member, and two buffering members. The bracket has at least one aperture, and the screwing member passes through the aperture to lock the bracket to the projection lens. A diameter of the at least one aperture in a first direction is greater than a diameter of the at least one aperture in a second direction perpendicular to the first direction. The two buffer members are respectively disposed on opposite ends of the bracket and lean against the two casings in the first direction, respectively.

A projector of disclosure includes a light source, a light valve, and a projection lens module. The light source is configured to provide an illumination beam. The light valve is configured to convert the illumination beam into an image beam. The projection lens module includes two casings, a projection lens, and a carrier structure. The projection lens is disposed between the two casings and configured to project the image beam. The carrier structure includes a bracket, at least one screwing member, and two buffer members. The bracket has at least one aperture, and the screwing member passes through the aperture to lock the bracket to the projection lens. A diameter of the at least one aperture in a first direction is greater than a diameter of the at least one aperture in a second direction perpendicular to the first direction. The two buffer members are respectively disposed on opposite ends of the bracket and lean against the two casings in the first direction, respectively.

Based on the above, in the projection lens module of the disclosure, the opposite ends of the bracket for the projection lens to be locked are provided with buffer members to provide a favorable buffering effect by the two buffer members when the projection lens is shaken. In addition, the bracket has an elongated aperture for the projection lens to be locked, so that a locking position of the projection lens on the bracket has a space for displacement, so as to absorb a position error caused by manufacture and assembly of the projection lens to avoid the projection lens not being able to focus due to unintended shift of the bracket after the projection lens is locked to the bracket. Therefore, the buffer members on the opposite ends of the bracket may be disposed between the bracket and the casings with almost no compression, so as to provide a favorable buffering effect by sufficient compressible amount of each of the buffer members when the projection lens is shaken.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1:
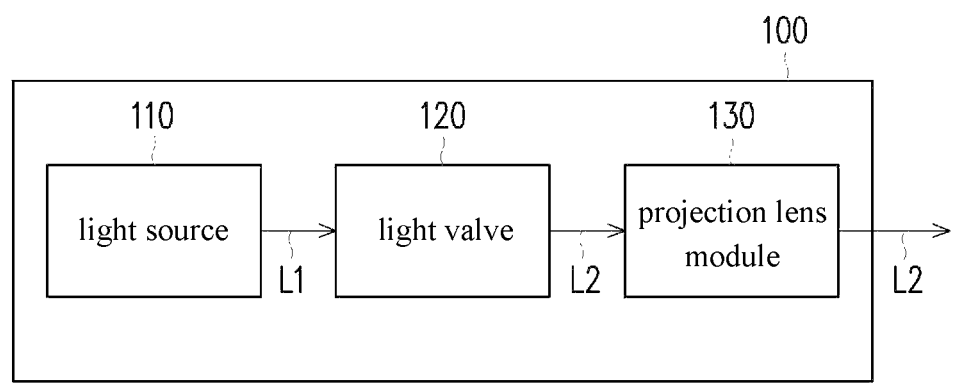
FIG. 1 is a schematic view of a projector according to an embodiment of the disclosure.
Figure 2:
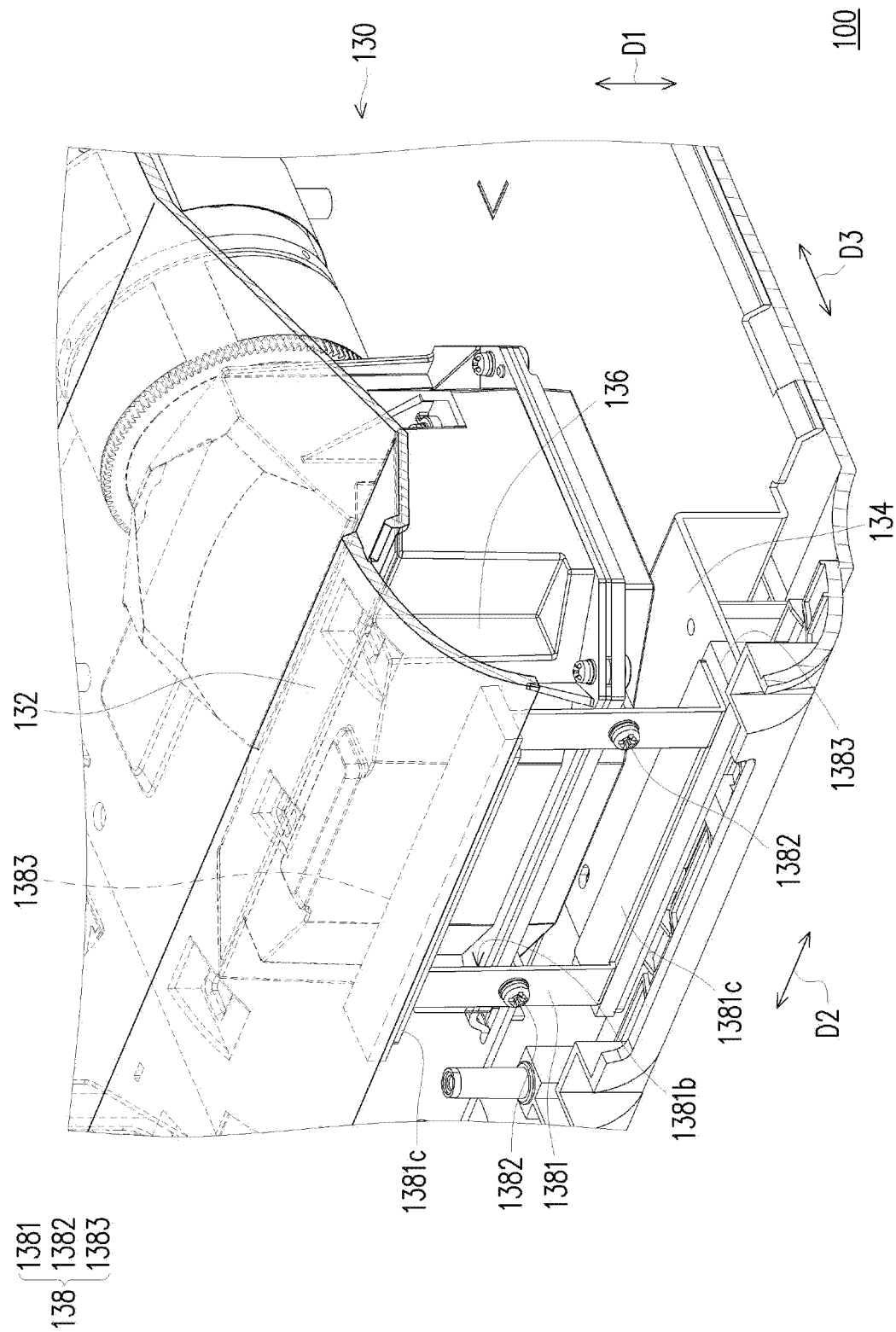
FIG. 2 is a partial three-dimensional view of the projector of FIG. 1.
Figure 3:
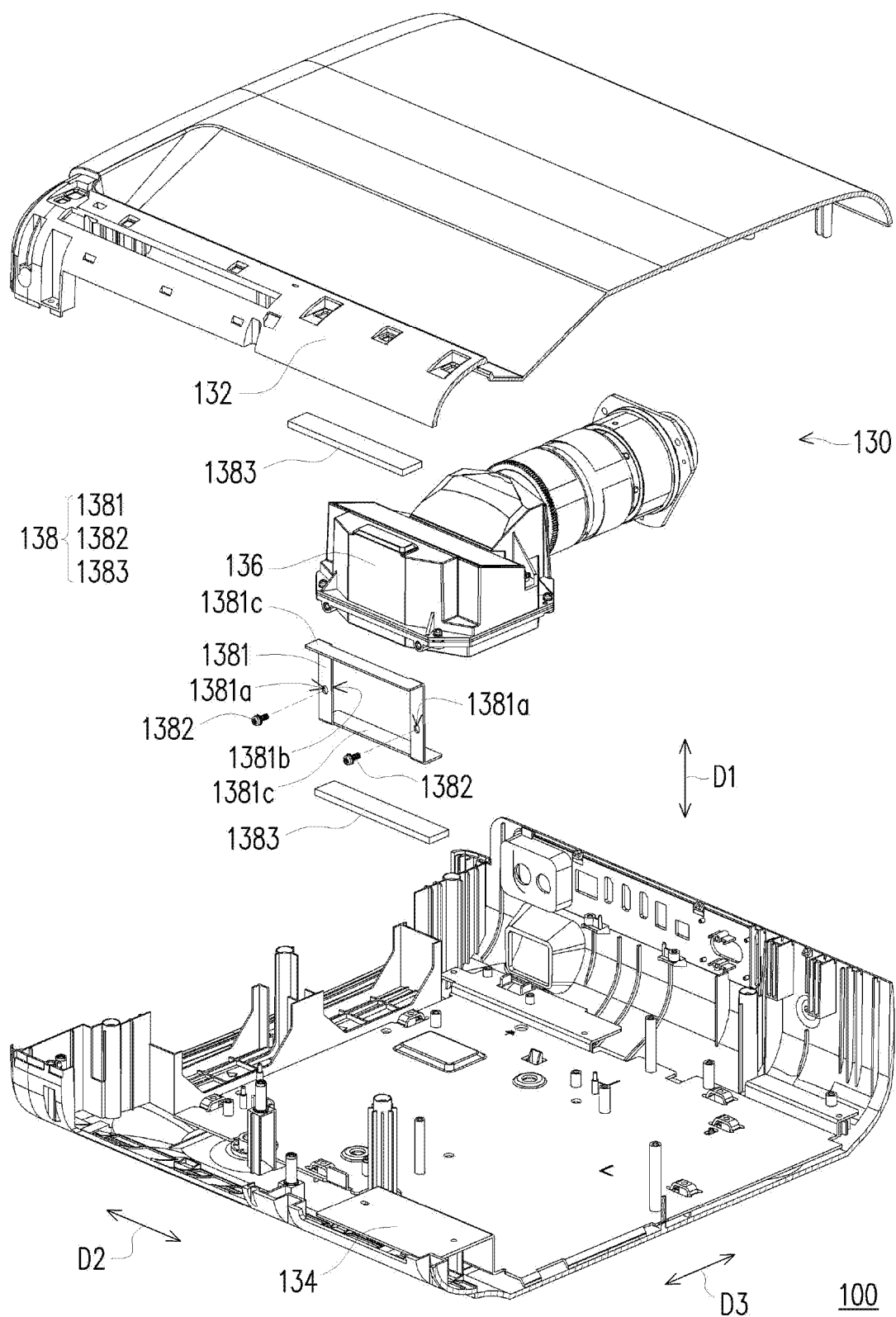
FIG. 3 is an exploded view of the projector of FIG. 2.

FIG. 1 is a schematic view of a projector according to an embodiment of the disclosure. FIG. 2 is a partial three-dimensional view of the projector of FIG. 1. FIG. 3 is an exploded view of the projector of FIG. 2. Referring to FIG. 1 to FIG. 3, a projector 100 according to this embodiment includes a light source 110, a light valve 120, and a projection lens module 130. The light source 110 is configured to provide an illumination beam L1, and the light valve 120 is configured to convert the illumination beam L1 into an image light beam L2. The projection lens module 130 includes two casings 132 and 134, and a projection lens 136. The two casings 132 and 134 are, for example, at least a partial structure of a base of the projector 100 and at least a partial structure of an upper cover of the projector 100, respectively. The projection lens 136 is disposed between the two casings 132 and 134, and configured to project the image beam L2.

Figure 4:
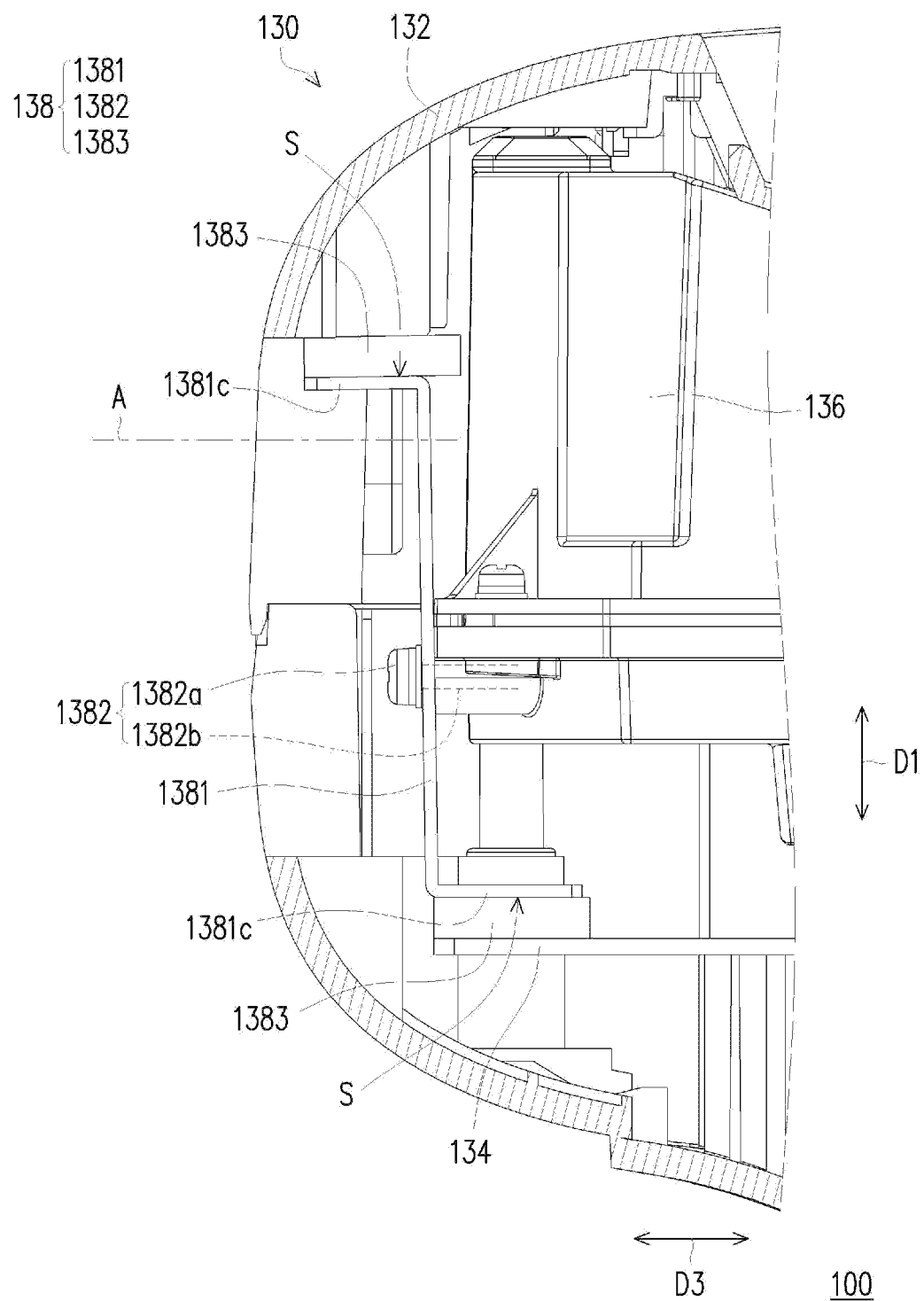
FIG. 4 is a partial side view of the projector of FIG. 2.

FIG. 4 is a partial side view of the projector of FIG. 2. Referring to FIG. 2 to FIG. 4, the projection lens module 130 according to this embodiment further includes a carrier structure 138. The carrier structure 138 includes a bracket 1381, two screwing members 1382, and two buffer members 1383. The two buffer members 1383 are, for example, foam or other elastic materials having a buffering effect, which are respectively disposed on opposite ends of the bracket 1381 and respectively lean against the two casings 132 and 134 in a first direction D1 (for example, a vertical direction of the projector 100). The projection lens 136 is locked to the bracket 1381 by two screwing members 1382. The opposite ends of the bracket 1381 for the projection lens 136 to be locked are provided with buffer members 1383 to provide a favorable buffering effect by the two buffer members 1383 when the projection lens 136 is shaken.

Figure 5:
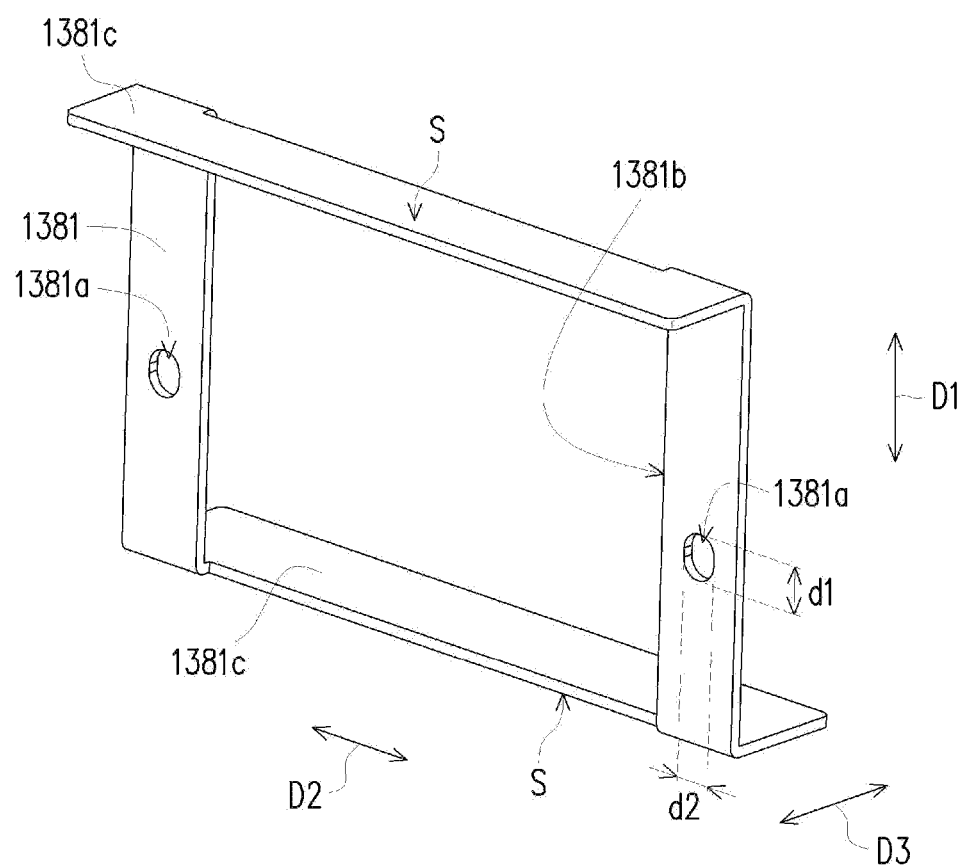
FIG. 5 is a three-dimensional view of a bracket of FIG. 2.

FIG. 5 is a three-dimensional view of a bracket of FIG. 2. Referring to FIG. 3 to FIG. 5, the bracket 1381 according to this embodiment has two apertures 1381a as shown in FIG. 5. As shown in FIG. 3, each of the apertures 1381a is located between the two buffer members 1383. The two screwing members pass through the two apertures 1381a of the bracket 1381 to lock the bracket 1381 to the projection lens 136 along a third direction D3 perpendicular to the first direction D1 (for example, a front-rear direction of the projector 100). Specifically, as shown in FIG. 4, each of the screwing member 1382 includes a stopping portion 1382a and a screwing portion 1382b connected to each other. The screwing portion 1382b passes through the aperture 1381a (shown in FIG. 5). The aperture 1381a in a second direction D2 perpendicular to the first direction D1 and the third direction D3 (for example, a left-right direction of the projector 100) has a diameter d2 smaller than an outer diameter of the stopping portion 1382a (shown in FIG. 4), so that the bracket 1381 is confined between the stopping portion 1382a and the projection lens 136. The first direction D1 and the second direction D2 (shown in FIG. 3) are, for example, perpendicular to an optical axis A of the projection lens 136 (shown in FIG. 4).

In addition, according to this embodiment, as shown in FIG. 5, a diameter d1 of the aperture 1381a in the first direction D1 is greater than the diameter d2 of the aperture 1381a in the second direction D2. That is, the aperture 1381a is an elongated aperture extending along the first direction D1, so that a locking position of the projection lens 136 on the bracket 1381 as shown in FIG. 2 has a space for displacement, so as to absorb a position error caused by manufacture and assembly of each of the projector 100 to avoid the projection lens 136 not being able to focus due to unintended shift of the bracket 1381 after the projection lens 136 is locked to the bracket 1381. Therefore, the buffer members 1383 on the opposite ends of the bracket 1381 may be disposed between the bracket 1381 and the casings 132 and 134 with almost no compression, so as to provide a favorable buffering effect by sufficient compressible amount of each of the buffer members 1383 when the projection lens 136 is shaken.

A structural shape of the bracket according to this embodiment will be described in detail below. Referring to FIG. 5, the bracket 1381 according to this embodiment is, for example, a sheet metal, which has an opening 1381b. The opening 1381b is located between the two apertures 1381a, and the optical axis A of the projection lens 136 (shown in FIG. 4) passes through the opening 1381b of the bracket 1381, so that the projection lens 136 may smoothly project the image beam L2 (shown in FIG. 1) out of the projector 100. In addition, the bracket 1381 according to this embodiment has two opposite bending portions 1381c, and each of the bending portions 1381c has a bearing surface S perpendicular to the first direction D1. As shown in FIG. 3, the two buffer members 1383 are respectively disposed on the bearing surfaces S of the two bending portions 1381c and face the two casings 132 and 134 respectively. According to other embodiments, the bracket 1381 may be other suitable shapes, and the disclosure is not limited thereto.

In summary, in the projection lens module of the disclosure, the opposite ends of the bracket for the projection lens to be locked are provided with buffer members to provide a favorable buffering effect by the two buffer members when the projection lens is shaken. In addition, the bracket has an elongated aperture for the projection lens to be locked, so that a locking position of the projection lens on the bracket has a space for displacement, so as to absorb a position error caused by manufacture and assembly of the projection lens to avoid the projection lens not being able to focus due to unintended shift of the bracket after the projection lens is locked to the bracket. Therefore, the buffer members on the opposite ends of the bracket may be disposed between the bracket and the casings with almost no compression, so as to provide a favorable buffering effect by sufficient compressible amount of each of the buffer members when the projection lens is shaken.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens module comprising two casings, a projection lens, and a carrier structure, wherein
the projection lens is disposed between the two casings; and
the carrier structure comprises a bracket, at least one screwing member, and two buffer members, wherein the bracket has at least one aperture, the at least one screwing member passes through the at least one aperture to lock the bracket to the projection lens, a diameter of the at least one aperture in a first direction is greater than a diameter of the at least one aperture in a second direction perpendicular to the first direction, and the two buffer members are respectively disposed on opposite ends of the bracket and lean against the two casings in the first direction, respectively.

2. The projection lens module according to claim 1, wherein the at least one aperture is located between the two buffer members.

3. The projection lens module according to claim 1, wherein the at least one screwing member comprises a stopping portion and a screwing portion connected to each other, the screwing portion passes through the at least one aperture, and the at least one aperture in the second direction has a diameter smaller than an outer diameter of the stopping portion, such that the bracket is confined between the stopping portion and the projection lens.

4. The projection lens module according to claim 1, wherein the first direction and the second direction are perpendicular to an optical axis of the projection lens.

5. The projection lens module according to claim 1, wherein the at least one screwing member passes through the at least one aperture along a third direction, and the third direction is perpendicular to the first direction and perpendicular to the second direction.

6. The projection lens module according to claim 1, wherein a number of the at least one aperture is two, a number of the at least one screwing member is two, and the two screwing members respectively pass through the two apertures.

7. The projection lens module according to claim 6, wherein the bracket has an opening, the opening is located between the two apertures, and an optical axis of the projection lens passes through the opening.

8. The projection lens module according to claim 1, wherein the bracket has two opposite bending portions, and the two buffer members are respectively disposed on the two bending portions.

9. The projection lens module according to claim 8, wherein each of the bending portions has a bearing surface, each of the buffer members is disposed on a corresponding bearing surface, and the bearing surface is perpendicular to the first direction.

10. The projection lens module according to claim 1, wherein a material of each of the buffer members comprises foam.

11. A projector comprising a light source, a light valve, and a projection lens module, wherein
the light source is configured to provide an illumination beam;
the light valve is configured to convert the illumination beam into an image beam; and
the projection lens module comprises two casings, a projection lens, and a carrier structure, wherein
the projection lens is disposed between the two casings and configured to project the image beam; and
the carrier structure comprises a bracket, at least one screwing member, and two buffer members, wherein the bracket has at least one aperture, the at least one screwing member passes through the at least one aperture to lock the bracket to the projection lens, a diameter of the at least one aperture in a first direction is greater than a diameter of the at least one aperture in a second direction perpendicular to the first direction, and the two buffer members are respectively disposed on opposite ends of the bracket and lean against the two casings in the first direction, respectively.

12. The projector according to claim 11, wherein the at least one aperture is located between the two buffer members.

13. The projector according to claim 11, wherein the at least one screwing member comprises a stopping portion and a screwing portion connected to each other, the screwing portion passes through the at least one aperture, and the at least one aperture in the second direction has a diameter smaller than an outer diameter of the stopping portion, such that the bracket is confined between the stopping portion and the projection lens.

14. The projector according to claim 11, wherein the first direction and the second direction are perpendicular to an optical axis of the projection lens.

15. The projector according to claim 11, wherein the at least one screwing member passes through the at least one aperture along a third direction, and the third direction is perpendicular to the first direction and perpendicular to the second direction.

16. The projector according to claim 11, wherein a number of the at least one aperture is two, a number of the at least one screwing member is two, and the two screwing members pass through the two apertures.

17. The projector according to claim 16, wherein the bracket has an opening, the opening is located between the two apertures, and an optical axis of the projection lens passes through the opening.

18. The projector according to claim 11, wherein the bracket has two opposite bending portions, and the two buffer members are respectively disposed on the two bending portions.

19. The projector according to claim 18, wherein each of the bending portions has a bearing surface, each of the buffer members is disposed on a corresponding bearing surface, and the bearing surface is perpendicular to the first direction.

20. The projector according to claim 11, wherein a material of each of the buffer members comprises foam.

* * * * *